(12) United States Patent
Lee

(10) Patent No.: US 7,477,340 B2
(45) Date of Patent: Jan. 13, 2009

(54) LIGHT GUIDE PANEL USING STAMPER, AND METHOD AND DEVICE FOR PRODUCING THE SAME

(75) Inventor: Jae-Sook Lee, Gyeonggi-do (KR)

(73) Assignee: Jeong Moon Information Co., Ltd., Gyeonggi-do (KR)

( * ) Notice: Subject to any disclaimer, the term of this patent is extended or adjusted under 35 U.S.C. 154(b) by 336 days.

(21) Appl. No.: 10/595,369

(22) PCT Filed: Dec. 1, 2003

(86) PCT No.: PCT/KR03/02617

§ 371 (c)(1),
(2), (4) Date: Apr. 13, 2006

(87) PCT Pub. No.: WO2005/050298

PCT Pub. Date: Jun. 2, 2005

(65) Prior Publication Data

US 2007/0035507 A1    Feb. 15, 2007

(30) Foreign Application Priority Data

Nov. 24, 2003   (KR)   ..................... 10-2003-0083525

(51) Int. Cl.
*G02F 1/1335*   (2006.01)
*C09K 19/00*   (2006.01)
(52) U.S. Cl. .............................. 349/65; 349/61; 428/1.2
(58) Field of Classification Search ........................ None
See application file for complete search history.

(56) References Cited

U.S. PATENT DOCUMENTS 6,955,839 B2 * 10/2005 Gocho et al. .................. 428/1.2

2002/0145861 A1   10/2002  Nishigaki
2003/0086030 A1 *  5/2003  Taniguchi et al. ............. 349/61

FOREIGN PATENT DOCUMENTS

| JP | 9222514 A | 8/1997 |
| KR | 1020000046665 A | 2/2002 |
| KR | 1020030032575 A | 4/2003 |
| WO | WO9854606 A | 12/1998 |
| WO | WO0057241 A | 9/2000 |

* cited by examiner

*Primary Examiner*—Tina M Wong
(74) *Attorney, Agent, or Firm*—Levine & Mandelbaum

(57) ABSTRACT

Disclosed is a light guide panel using a laser stamper, and a method and a device for producing the same. The light guide panel using a laser stamper, which is used as a rear surface light source of a liquid crystal display, is characterized in that a substrate for the light guide panel, made of an acryl-based material allowing light to penetrate therethrough, is cut into a plurality of light guide panels, and an uneven pattern on a lateral surface of the light guide panel is formed by transcribing a reverse uneven pattern of the laser stamper onto the lateral surface of the light guide panel through a laser direct recording process. Furthermore, the device for producing the light guide panel, includes a laser stamper producing part to produce a laser stamper capable of conducting a laser direct recording process, and a light guide panel producing part to produce a substrate for the light guide panel and the light guide panel in commercial quantity using the laser stamper. In this regard, the laser stamper includes a metal stamper to prevent durability of an acryl-based substrate from being reduced when the acryl-based substrate is used in an injection molding process.

8 Claims, 5 Drawing Sheets

PRIOR ART

FIG. 1b
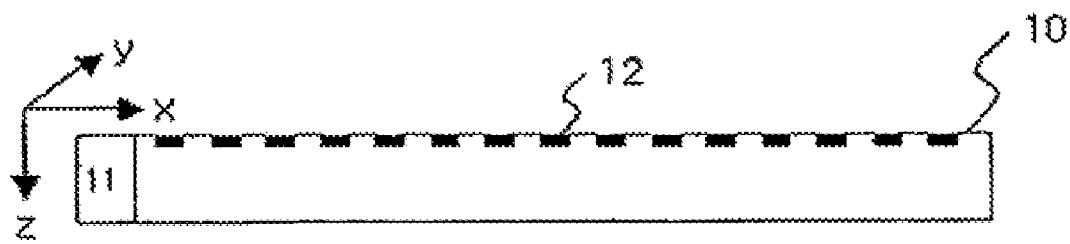
PRIOR ART
[FIG. 2]
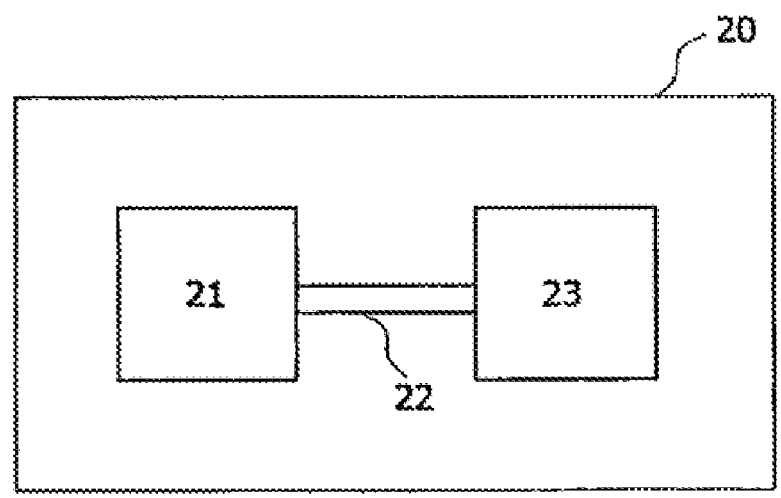
PRIOR ART

LIGHT GUIDE PANEL USING STAMPER, AND METHOD AND DEVICE FOR PRODUCING THE SAME

TECHNICAL FIELD

The present invention pertains to a light guide panel using a laser stamper, and a method and a device for producing the same. More particularly, the present invention relates to a light guide panel using a laser stamper, which is used as a rear surface light source of a liquid crystal display. At this time, a substrate for the light guide panel, made of an acryl-based material allowing light to penetrate therethrough, is cut into a plurality of light guide panels, and an uneven pattern on a surface of the light guide panel is formed by transcribing a reverse uneven pattern of the laser stamper onto the surface of the light guide panel through a laser direct recording process. Furthermore, the present invention relates to a device for producing a light guide panel, including a laser stamper producing part to produce a laser stamper capable of conducting a laser direct recording process, and a light guide panel producing part to produce a substrate for the light guide panel and the light guide panel in commercial quantity using the laser stamper. In this regard, the laser stamper includes a metal stamper to prevent a reduction in durability of an acryl-based substrate when the acryl-based substrate is used in an injection molding process. Additionally, the present invention provides a method of producing the light guide panel using the device.

BACKGROUND ART

Generally, a liquid crystal display (LCD) is a light receiving element which does not radiate light itself, thus it is usually used in conjunction with a back light unit (BLU) capable of uniformly increasing the illumination of a screen. In this respect, the BLU includes a light guide panel leading the refraction or the scattering of the light to convert an initial point or linear light source, such as a LED (light emitting diode), into a surface light source.

FIGS. 1A and 1B are a plan view and a sectional view of a conventional light guide panel, respectively.

With reference to FIGS. 1A and 1B, a light source 11, a kind of a fluorescent lamp such as the LED, is positioned at a lateral end of a light guide panel 10 and radiates light toward the light guide panel 10. A plurality of patterns 12 are formed on any one side of the light guide panel 10 to refract, scatter, and reflect the light radiated from the light source 11 to allow an intensity distribution of the light source 11 to be relatively uniform throughout the light guide panel 10 of the LCD, thereby an image is clearly displayed in the LCD.

The production of a mold on which the pattern 12 is formed is very important in the production of the light guide panel 10. With respect to the production of the mold, conventionally, a mold core is mechanically processed or etched to produce the mold on which the pattern is formed.

FIG. 2 schematically illustrates a mold used in a device for producing a light guide panel using a mold core according to a conventional technology.

Referring to FIG. 2, the mold used in the device for producing the light guide panel includes a heater 21, a gate 22, and the mold core 23.

A material used to produce the light guide panel is heated to a predetermined temperature by the heater 21, and transported through the narrow gate 22 into the mold core 23 to form the heated material into a predetermined shape in the mold core 23 according to a predetermined process such as an injection molding.

A detailed description of a conventional technology of producing a light guide panel using a mold core on which a pattern is formed is disclosed in Korean Utility Model Laid-Open Publication No. 20-0306881, entitled "a device for producing a light guide panel and a heat treatment device used in the same" filed by and allowed to this inventor.

However, the conventional technology of producing the light guide panel 10 using the mold core 23 on which the pattern is formed, as shown in FIG. 2, is disadvantageous in that it takes four to eight hours to replace the used mold core 23 with a new one, and operating conditions of an injection molding process must be optimized whenever the used mold core 23 is replaced with a new one.

Additionally, it takes 20 to 40 days to produce the mold core 23 on which the pattern is formed, thus the conventional technology is disadvantageous in terms of production time, manpower, and thus production costs.

Meanwhile, Korean Pat. Laid-Open Publication No. 2002-0015865, entitled "a device and a method of producing a light guide panel for a panel illuminator", filed by this inventor discloses a method of producing the light guide panel using a stamper to avoid the disadvantages occurring in the conventional technology of producing the light guide panel using the mold core.

However, the method using the stamper is disadvantageous in that the stamper must be newly produced whenever the pattern is changed because it is impossible to conduct the pattern revision for the changed pattern. In other words, in the case of developing a new model of the light guide panel, the pattern revision is usually conducted ten times because of a design change or an error revision, but in the method of producing the light guide panel using the stamper, it is impossible to revise the pattern formed on the stamper, thus the stamper must be produced in conformity to the pattern revision. Hence, the method is insufficiently competitive in terms of production time, manpower, and thus production costs.

DISCLOSURE OF THE INVENTION

Accordingly, the present invention has been made keeping in mind the above problems occurring in the prior art, and an aspect of the present invention is to provide a light guide panel using a laser stamper, which has advantages in that the laser stamper is easily replaced with a new one within a short time (about 15 min), it is not necessary to conduct the optimization process when the used laser stamper is replaced with a new one, and a pattern forming or a pattern changing time, manpower, and production costs are all reduced, thereby the productivity of the light guide panel is improved, and a method and a device for producing the same.

It is another aspect of the present invention to provide a light guide panel using a laser stamper, which has advantages in that the ease of the pattern formation and revision are realized to reduce a time of developing a light guide panel from six months to several days (about five days), thereby manpower and thus production costs are saved, and a method and a device for producing the same.

Additional aspects and/or advantages of the invention will be set forth in part in the description which follows and, in part, will be obvious from the description, or may be learned by practice of the invention.

The above and/or other aspects are achieved by providing a light guide panel using a laser stamper, which is used as a rear surface light source of a liquid crystal display, characterized in that a substrate for the light guide panel, made of an acryl-based material which allows light to penetrate therethrough, is cut into a plurality of light guide panels, and an uneven pattern on a lateral surface of the light guide panel is formed by transcribing a reverse uneven pattern of the laser stamper onto the lateral surface of the light guide panel through a laser direct recording process.

The above and/or other aspects are achieved by providing a method of producing a light guide panel using a laser stamper, including cleaning and drying a substrate, coating a photosensitizer on the cleaned and dried substrate, heating and cooling the photosensitizer-coated substrate, irradiating a laser beam onto the photosensitizer-coated substrate to record a pattern on the photosensitizer-coated substrate, developing the patterned substrate, coating a seed layer on the developed substrate, constructing a metal master with a predetermined thickness on the seed layer-coated substrate, processing a rear surface of the metal master, cutting and polishing the metal master as means of being fitted in a mold to produce the laser stamper, injection-molding the laser stamper after the laser stamper is installed in the mold to accomplish the substrate for the light guide panel, and cutting the substrate for the light guide panel.

The above and/or other aspects are achieved by providing a device for producing a light guide panel, including a laser stamper producing part to produce a laser stamper capable of conducting a laser direct recording process, and a light guide panel producing part produces a substrate for the light guide panel and the light guide panel in commercial quantity using the laser stamper. In this regard, the laser stamper includes a metal stamper to prevent durability of an acryl-based substrate from being reduced when the acryl-based substrate is used in an injection molding process.

BRIEF DESCRIPTION OF THE DRAWINGS

The above and other aspects, features and other advantages of the present invention will be more clearly understood from the following detailed description taken in conjunction with the accompanying drawings, in which:

FIGS. 1A and 1B are a plan view and a sectional view of a conventional light guide panel, respectively;

FIG. 2 schematically illustrates a mold used in a device for producing a light guide panel using a mold core according to a conventional technology;

BEST MODE FOR CARRYING OUT THE INVENTION

Figure 1A:
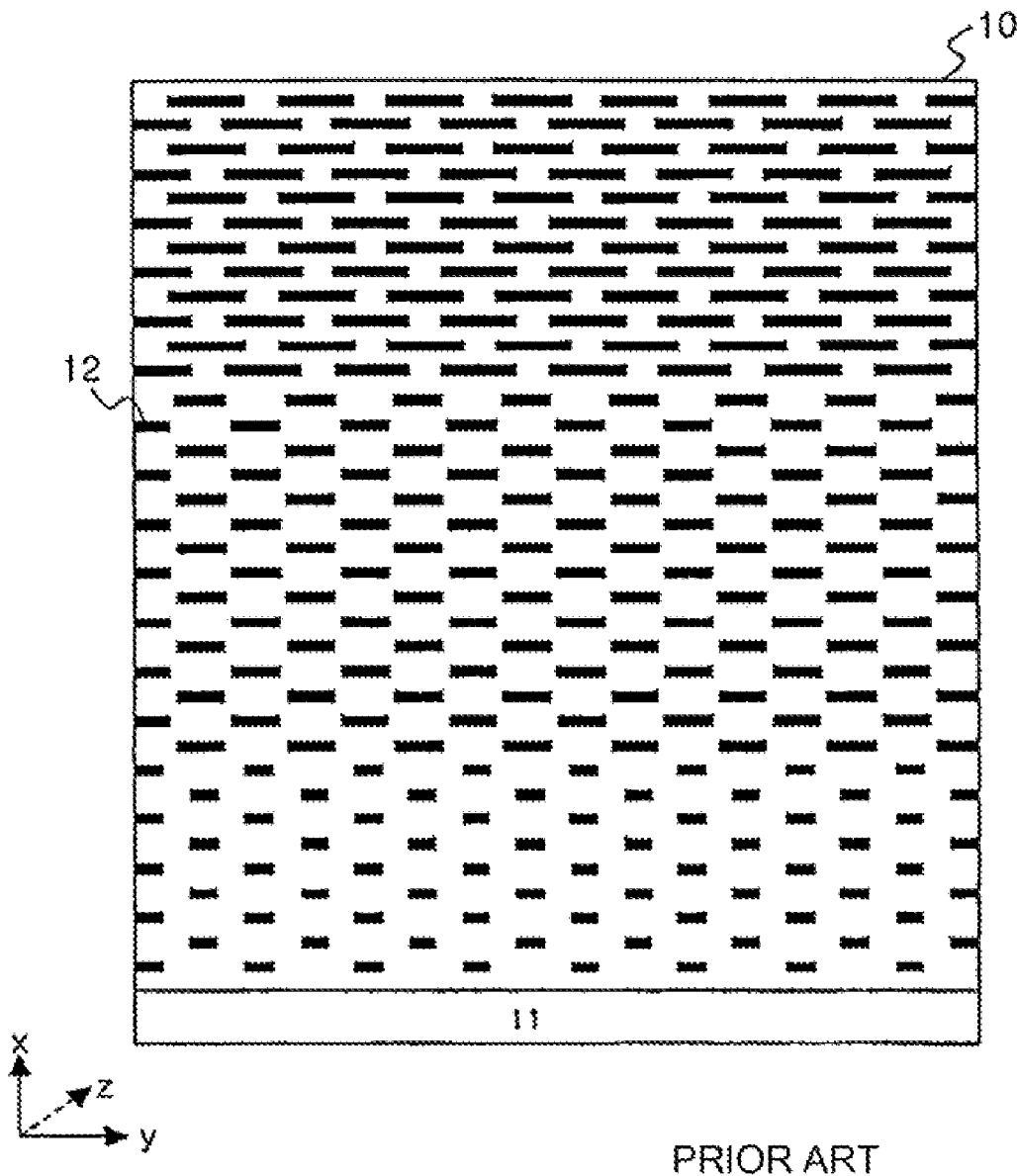

Reference should now be made to the drawings, in which the same reference numerals are used throughout the different drawings to designate the same or similar components.

Figure 3A:
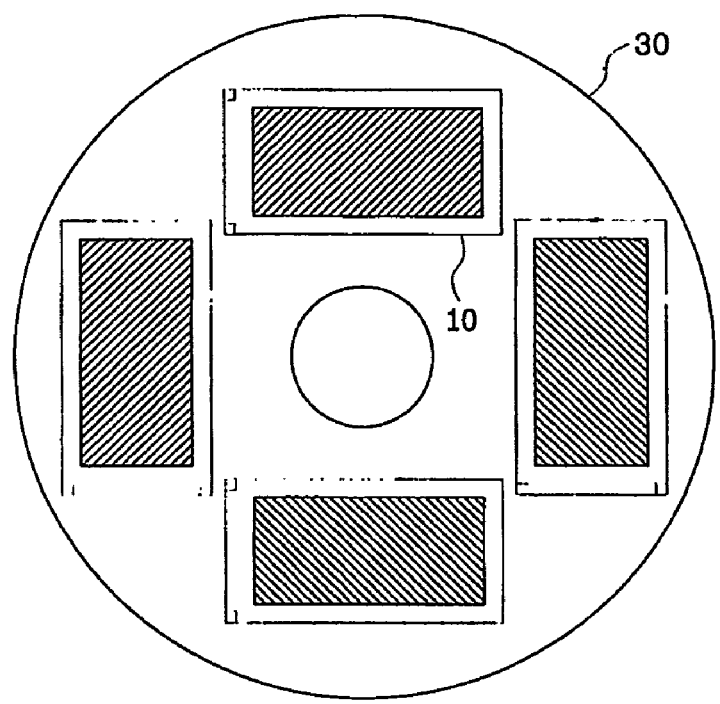
FIGS. 3A and 3B are a plan view and a perspective view of a substrate for a light guide panel according to the present invention, respectively.
Figure 3B:
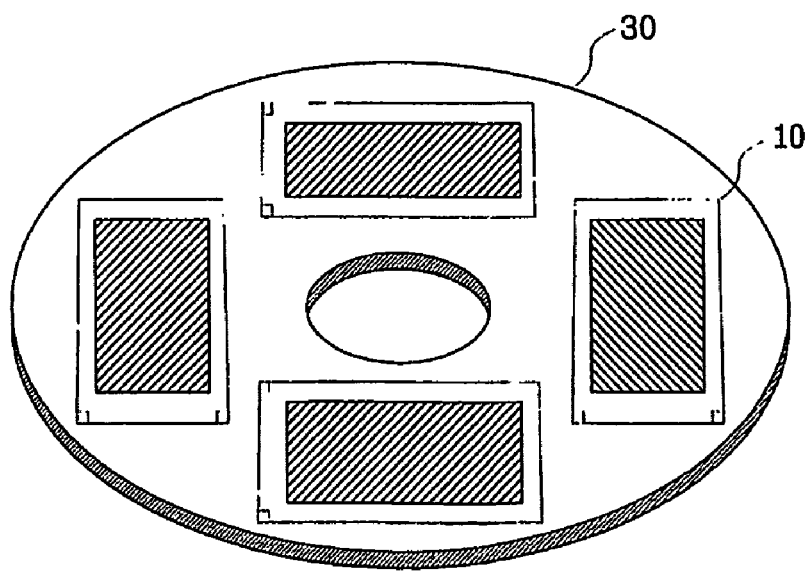

FIGS. 3A and 3B are a plan view and a perspective view of a substrate for a light guide panel according to the present invention, respectively.

With reference to FIGS. 3A and 3B, the light guide panel 10 serves to reflect light radiated from a light source 11 placed at a lateral part thereof, or allow the light to pass therethrough to change a direction of the light, and is made of an acryl-based material, through which the light is capable of penetrating, such as polymethacrylate (PMMA), polycarbonate (PC), and cycloolefin copolymer (COC). Preferably, a substrate 30 for the light guide panel 10 has a shape of a disc with an inner perimeter of 15 mm, an outer perimeter of 120 to 300 mm, and a thickness of 0.4 to 1.5 mm, which is similar to a shape of a compact disc (CD) used as an optical storage medium. Additionally, a laser stamper used to transcribe an uneven pattern on any one side of the substrate 30 for the light guide panel 10, to be used as a data recording surface, has the outer perimeter equal to or larger than the outer perimeter of the substrate 30 for the light guide panel 10. A dimensional error of an inner perimeter, an outer perimeter, and a thickness of the substrate 30 for the light guide panel 10 and the laser stamper are within a range of ±10%.

As described above, the substrate 30 for the light guide panel 10 includes a plurality of light guide panels 10, to be cut into each panel, and is produced using the laser stamper subjected to a laser direct recording process by a laser beam. At this time, as shown in FIGS. 3A and 3B, the number of the light guide panels 10 formed on one substrate 30 is preferably four. The laser stamper is mounted in the mold of a device for producing the light guide panel 10, and transcribes a pattern engraved by the laser beam on the data recording surface of the substrate 30 for the light guide panel 10. The light guide panel 10 having a desired uneven pattern is produced using the laser stamper with a reverse uneven pattern corresponding to the desired uneven pattern according to an injection molding process.

Further, the laser stamper may be detachably mounted on the mold 20 using a vacuum unit to create a vacuum, or by use of a mechanical manner without using the vacuum unit, thereby being fixed on the substrate at the center thereof. According to the present invention, in the case of revising the pattern of the light guide panel 10, the pattern formed on any one side of the laser stamper is revised pursuant to the laser direct recording process using the laser beam, thereby the revision of the pattern is easily conducted, and a production time of the light guide panel 10 is greatly reduced.

Figure 4:
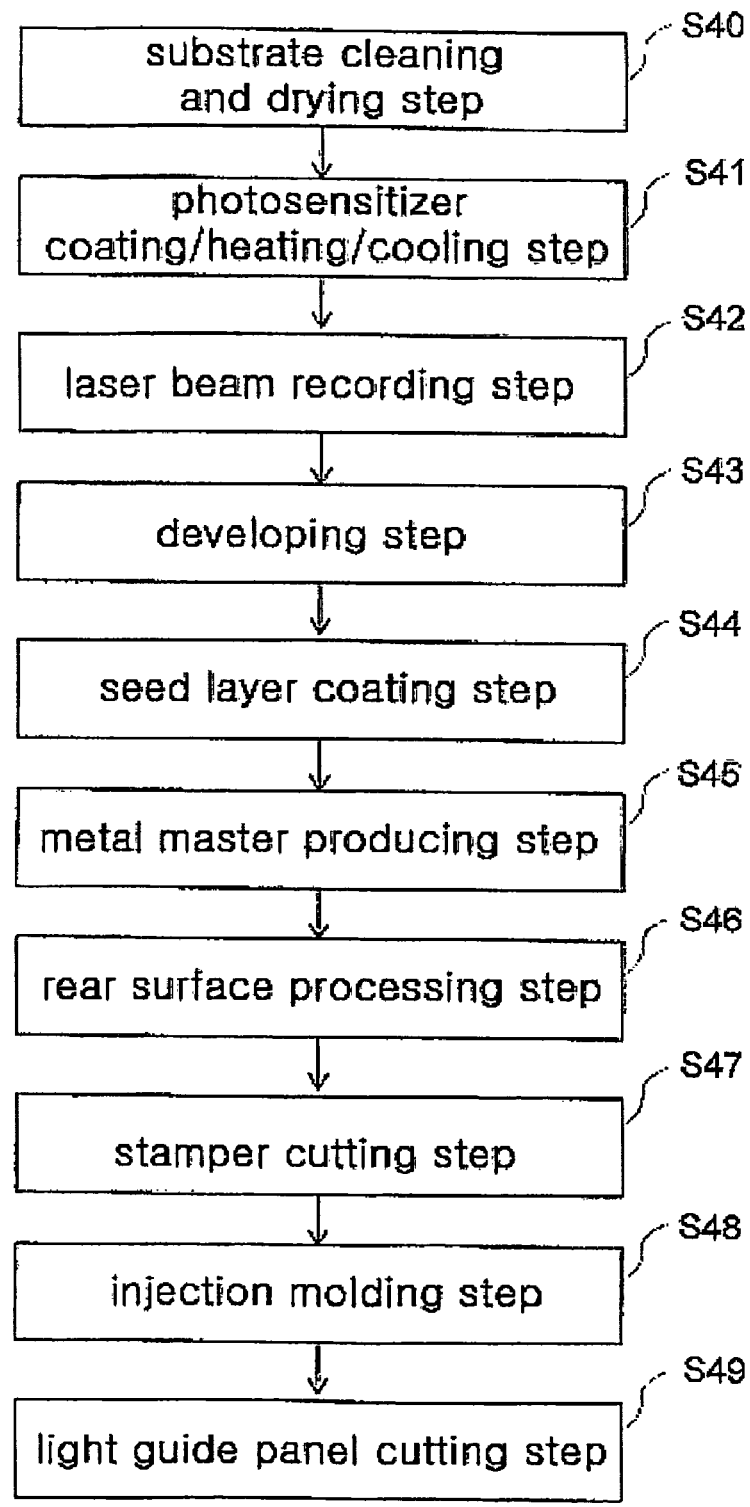
FIG. 4 is a flow chart illustrating the production of the light guide panel using a laser stamper according to the present invention.

FIG. 4 is a flow chart illustrating the production of the light guide panel using the laser stamper according to the present invention.

As shown in FIG. 4, a method of producing the light guide panel 10 using the laser stamper according to the present invention includes a substrate cleaning and drying step S40, a photosensitizer coating/heating/cooling step S41, a laser beam recording step S42, a developing step S43, a seed layer coating step S44, a metal master producing step S45, a rear surface processing step S46, a stamper cutting step S47, an injection molding step S48, and a light guide panel cutting step S49.

In detail, a material of a glass master, such as glass, to be used as the substrate 30 for the light guide panel 10 is cleaned and dried in operation S40. A photosensitizer is then coated on the cleaned and dried substrate, heated, and cooled in operation S41. A laser beam is irradiated onto the photosensitizer-coated substrate to record a pattern on the photosensitizer-coated substrate in operation S42. The patterned substrate is developed in operation S43, and coated with a seed layer in operation S44. A metal master with a predetermined thickness is then formed on the resulting substrate in operation S45.

A rear surface of the metal master is processed in operation S46, and properly cut and polished as a way to be fitted in the mold to produce the laser stamper having a similar shape to the substrate 30 for the light guide panel 10 as shown in FIGS. 3A and 3B in operation S46. After the laser stamper is installed in the mold, an injection molding process is conducted to produce the substrate 30 for the light guide panel 10 in operation S48. For instance, the laser stamper is attached to an upper part of the mold using a vacuum unit, and a lower part of the mold is then assembled with the upper part of the mold. After a predetermined time since a substance used to produce the light guide panel 10 is inserted into the mold, the lower part of the mold is separated from the upper part of the mold to produce the substrate 30 for the light guide panel 10. At this time, the substrate 30 for the light guide panel 10 includes a plurality of light guide panels 10 capable of being cut by the laser stamper. The substrate 30 is then properly cut into each light guide panel 10 (for example, in FIGS. 3A and 3B, the substrate 30 for the light guide panel 10 is cut into the four light guide panels 10) in operation S49.

Conventionally, a process of producing a stamper includes attaching a mask with a desired light guide pattern to a substrate, exposing the mask-attached substrate to UV (ultraviolet), developing the exposed substrate, electroplating the developed substrate using a metal such as nickel, and removing a plated portion from the resulting substrate. Therefore, it is impossible to revise the pattern in the conventional process of producing the stamper. According to the present invention, however, the laser stamper is subjected to the laser direct recording process using a laser beam to produce the light guide panel, thus it is feasible to directly pattern the stamper or to revise the pattern of the stamper.

Furthermore, in the case of a conventional process of producing the light guide panel using a mold core, a cycle time taken to produce two cavities of light guide panels 10 is about 20 sec (the number of the light guide panel produced per unit hour: about 0.1 EA/sec). The reason for this is that a feeding time of a raw material in the injection molding process is relatively long because the raw material is fed through the narrow gate into the mold core, and it is impossible to reduce the cycle time because the product's quality is reduced due to a cooling time of the raw material. However, in the case of the laser stamper according to the present invention, the cycle time taken to produce four cavities of light guide panels 10 is about four to six sec (the number of the light guide panel produced per unit hour: about 1 to 1.25 EA/sec) because the raw material is fed from the center of the substrate for the light guide panel. Additionally, the substrate for the light guide panel is cut into desired light guide panels using a cutter machine within about four sec, thus the number of the light guide panel produced per unit hour is one EA/sec when the substrate includes the four light guide panels as shown in FIG. 3A. Hence, the present invention is advantageous in that productivity is improved by about four to five times in comparison with that of the conventional process of producing the light guide panel, and a quality deviation of products is maintained within a range of 10% because of use of the laser stamper.

Figure 5:
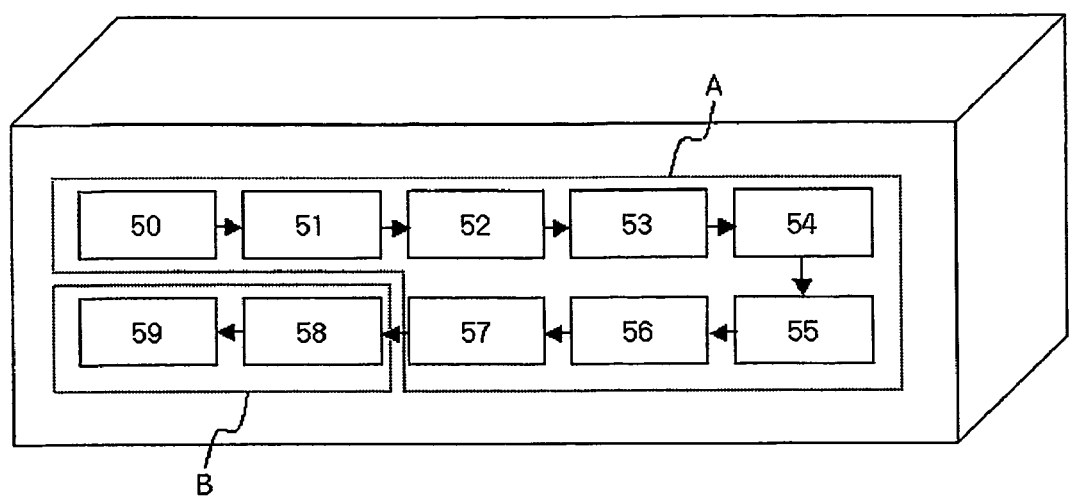
FIG. 5 schematically illustrates a device for producing the light guide panel using the laser stamper according to the present invention.

FIG. 5 schematically illustrates a device for producing the light guide panel using the laser stamper according to the present invention.

The device for producing the light guide panel according to the present invention is provided with a laser stamper producing part (A) to produce the laser stamper capable of conducting the laser direct recording process, and a light guide panel producing part (B) to produce the substrate 30 for the light guide panel and the light guide panel 10 in commercial quantity using the laser stamper.

Referring to FIG. 5, the device for producing the light guide panel using the laser stamper according to the present invention includes the laser stamper producing part (A) having a substrate cleaning and drying unit 50, a photosensitizer coating/heating/cooling unit 51, a laser beam recording unit 52, a developing unit 53, a seed layer coating unit 54, a metal master producing unit 55, a rear surface processing unit 56, and a stamper cutting unit 57. The device also includes the light guide panel producing part (B) having an injection molding unit 58 and a light guide panel cutting unit 59.

The substrate cleaning and drying unit 50 removes impurities or alien substances from the substrate to minimize an error occurring in the laser direct recording process. The photosensitizer coating/heating/cooling unit 51 coats a photosensitizer for the laser direct recording process on the substrate using a turntable to minimize a thickness deviation of the photosensitizer coated on the substrate, and increases an attachment power between the substrate and photosensitizer through a heating and a cooling process.

The laser beam recording unit 52 directly processes the photosensitizer-coated substrate using a laser beam to pattern the photosensitizer-coated substrate, thereby easily forming a desired shape, a length, and a density of a pattern on such substrate. The developing unit 53 removes a portion of the substrate, which is irradiated by the laser beam, using a developing solution to convert a laser recorded portion into a pattern. The seed layer coating unit 54 coats the seed layer on the developed substrate. In this respect, the seed layer is a thin film allowing a current to flow therethrough, and is used as a conductive layer in an electroforming process.

The metal master producing unit 55 deposits a metal layer on the substrate coated with the seed layer by the seed layer coating unit 54. In the case of using a glass substrate or an acryl-based substrate in the injection molding process, durability of the glass substrate or acryl-based substrate is apt to be significantly reduced. Accordingly, the metal layer is deposited on the glass substrate or acryl-based substrate to produce a metal master, and the metal master thusly produced is used as the laser stamper, that is, a metal stamper. The rear surface processing unit 56 grinds a rear surface of the metal stamper produced by the metal master producing unit 55. At this time, a roughness of the rear surface of the metal stamper is generally 5 μm, and the rear surface of the metal stamper is ground such that the metal stamper is mounted on an injection molder used as the injection molding unit 58.

The stamper cutting unit 57 properly cuts the metal stamper such that the cut metal stamper is fitted in the mold. The injection molding unit 57 is a kind of the injection molder for producing the metal stamper in commercial quantity according to the injection molding process after the metal stamper is mounted on the mold. The light guide panel cutting unit 59 cuts the resulting substrate produced through the injection molding process into each light guide panel 10.

According to the present invention, the laser stamper acting as the metal stamper manufactured by the laser beam is used to produce high quality products without an additional process, prior to injection-molding the light guide panel acting as an essential component of a backlight unit used as a rear surface light source of an LCD. Various shapes of patterns are formed by controlling the laser beam, and when a specification for the alignment of the pattern is determined, the laser stamper and the backlight unit with the high brightness are produced pursuant to the alignment of the pattern.

Figure 6:
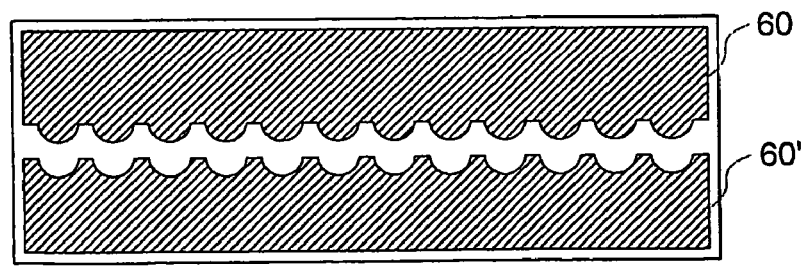
FIG. 6 is a sectional view of an engraved stamper produced using an embossed stamper according to the present invention.

FIG. 6 is a sectional view of an engraved stamper produced using an embossed stamper according to the present invention.

When the laser stamper produced according to the present invention is assumed as the embossed stamper 60, the engraved stamper 60' is produced in conformity to the electroforming process. In this respect, the electroforming process is based on an electroplating mechanism. However, in the case of the electroforming process, a relatively thick and strong layer of a metal is coated on a metal substrate made of a metal different from the layer to produce or reproduce a structure different from the original metal substrate in commercial quantity while the electroplating process plates a thin layer of a metal on another metal.

According to the electroforming process, a metal layer with a thickness of several mm is plated on a master pattern through an electrolysis process or other processes. At this time, after the master pattern is removed, another master pattern is made out of a predetermined material. Furthermore, a basic model is produced using a wax, and a master model corresponding to a reflection shape is formed with the use of a rubber. The electroforming process is applied to a very complicated shape of tooling with relatively high reliability, but has a limit in being applied to the case of the tooling with deep slots.

The process of producing the engraved stamper 60' is conducted for about one hour, and tens of engraved stampers 60' are produced using one embossed stamper 60, thereby leading the improved quality control.

INDUSTRIAL APPLICABILITY

As apparent from the above description, the present invention provides a method and a device for producing a light guide panel using a laser stamper, which has advantages in that the laser stamper is easily replaced with a new one within a short time (about 15 min), and it is not necessary to conduct the optimization process during replacing the used laser stamper with a new one.

The method and device for producing the light guide panel according to the present invention have an advantage in that a pattern forming or a pattern changing time, manpower, and thus production costs are reduced, thereby productivity of the light guide panel is improved.

Other advantages of the method and device according to the present invention are that ease of the pattern formation and revision is realized to reduce a term of developing a light guide panel from six months to several days (about five days), thereby manpower and production costs are saved.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

The invention claimed is:

1. A light guide panel using a laser stamper, which is used as a rear surface light source of a liquid crystal display, wherein a substrate for the light guide panel, made of an acryl-based material allowing light to penetrate therethrough, is cut into a plurality of light guide panels, and an uneven pattern on a lateral surface of the light guide panel is formed by transcribing a reverse uneven pattern of the laser stamper onto the lateral surface of the light guide panel through a laser direct recording process, and wherein the substrate for the light guide panel is formed into a shape of a compact disc, used as a photodisc recording medium, having an inner perimeter of 15 mm, an outer perimeter of 120 to 300 mm, and a thickness of 0.4 to 1.5 mm, and a dimensional error of an inner perimeter, an outer perimeter, and a thickness of the substrate and the laser stamper is within a range of ±10%.

2. The light guide panel as set forth in claim 1, wherein the acryl-based material is selected from the group consisting of polymethacrylate (PMMA), polycarbonate (PC), and cycloolefin copolymer (COC).

3. A method of producing a light guide panel using a laser stamper, comprising:
   cleaning and drying a substrate;
   coating a photosensitizer on the cleaned and dried substrate, and heating and cooling the photosensitizer-coated substrate;
   irradiating a laser beam onto the photosensitizer-coated substrate to record a pattern on the photosensitizer-coated substrate;
   developing the patterned substrate;
   coating a seed layer on the developed substrate;
   constructing a metal master with a predetermined thickness on the seed layer-coated substrate;
   processing a rear surface of the metal master;
   cutting and polishing the metal master as a way to be fitted in a mold to produce the laser stamper;
   injection-molding the laser stamper after the laser stamper is installed in the mold to accomplish the substrate for the light guide panel; and
   cutting the substrate for the light guide panel.

4. The method as set forth in claim 3, wherein a plurality of engraved stampers are produced or reproduced using one embossed stamper through an electroforming process in which a master model corresponding in shape to a reflection shape is made out of a predetermined material, after a master pattern is removed, in a case of the laser stamper is the embossed stamper.

5. A device for producing a light guide panel, comprising:
   a laser stamper producing part to produce a laser stamper capable of conducting a laser direct recording process, and
   a light guide panel producing part to produce a substrate for the light guide panel and the light guide panel in commercial quantity using the laser stamper,
   wherein, the laser stamper includes a metal stamper to prevent durability of an acryl-based substrate from being reduced when the acryl-based substrate is used in an injection molding process, and
   wherein the laser stamper producing part comprises:
   a substrate cleaning and drying unit to remove impurities or alien substances from a substrate;
   a photosensitizer coating/heating/cooling unit to coat a photosensitizer for a laser direct recording process on the substrate using a turntable to minimize a thickness deviation of the photosensitizer coated on the substrate, and increases an attachment power between the substrate and photosensitizer through a heating and a cooling process;
   a laser beam recording unit to form a desired pattern on the photosensitizer-coated substrate using a laser beam through the laser direct recording process;
   a developing unit to remove a portion of the substrate, which is irradiated by the laser beam, using a developing solution;
   a seed layer coating unit to coat a seed layer on the developed substrate;

a metal master producing unit to deposit a metal layer on the substrate coated with the seed layer to produce a metal master;

a rear surface processing unit to grind a rear surface of the metal master; and a stamper cutting unit to cut the metal stamper such that the cut metal stamper is fitted in the mold to produce the laser stamper.

6. The device as set forth in claim 5, wherein the seed layer is a thin film allowing a current to flow therethrough, and is used as a conductive layer in an electroforming process.

7. The device as set forth in claim 5, wherein the rear surface processing unit grinds the rear surface of the metal master such that the rear surface of the metal master has a roughness suitable to mount the metal master on an injection molder used as the injection molding unit.

8. A device for producing a light guide panel, comprising:

a laser stamper producing part to produce a laser stamper capable of conducting a laser direct recording process, and a light guide panel producing part to produce a substrate for the light guide panel and the light guide panel in commercial quantity using the laser stamper, wherein, the laser stamper includes a metal stamper to prevent durability of an acryl-based substrate from being reduced when the acryl-based substrate is used in an injection molding process, wherein the light guide panel producing part comprises an injection molding unit to produce the substrate for the light guide panel through the injection molding process after the laser stamper is mounted on the mold; and a light guide panel cutting unit to cut the substrate for the light guide panel, produced through the injection molding process, into each light guide panel.

* * * * *